(12) United States Patent
Zhang (10) Patent No.: US 11,093,381 B2
(45) Date of Patent: Aug. 17, 2021

(54) SHARING METHOD, APPARATUS, STORAGE MEDIUM, AND TERMINAL

(71) Applicant: SANECHIPS TECHNOLOGY CO., LTD, Shenzhen (CN)

(72) Inventor: Feng Zhang, Shenzhen (CN)

(73) Assignee: SANECHIPS TECHNOLOGY CO., LTD., Shenzhen (CN)

(*) Notice: Subject to any disclaimer, the term of this patent is extended or adjusted under 35 U.S.C. 154(b) by 32 days.

(21) Appl. No.: 16/614,466

(22) PCT Filed: Aug. 28, 2017

(86) PCT No.: PCT/CN2017/099359
§ 371 (c)(1),
(2) Date: Nov. 18, 2019

(87) PCT Pub. No.: WO2018/209841
PCT Pub. Date: Nov. 22, 2018

(65) Prior Publication Data
US 2020/0183824 A1   Jun. 11, 2020

(30) Foreign Application Priority Data
May 18, 2017   (CN) .......................... 201710353185.8

(51) Int. Cl.
G06F 12/02 (2006.01)
G06F 12/0806 (2016.01)
G06F 12/128 (2016.01)

(52) U.S. Cl.
CPC ........ *G06F 12/023* (2013.01); *G06F 12/0284* (2013.01); *G06F 12/0806* (2013.01); *G06F 12/128* (2013.01)

(58) Field of Classification Search
CPC ............... G06F 12/023; G06F 12/0284; G06F 12/0806; G06F 12/128
See application file for complete search history.

(56) References Cited

U.S. PATENT DOCUMENTS 5,287,511 A * 2/1994 Robinson ............ G06F 15/7835
717/106
7,327,749 B1 * 2/2008 Mott ....................... H04L 47/10
370/413

(Continued)

FOREIGN PATENT DOCUMENTS

| CN | 1680929 A   | 10/2005 |
|----|-------------|---------|
| CN | 103678199 A | 3/2014  |
| EP | 1645967 A1  | 4/2006  |

OTHER PUBLICATIONS

International Search Report for corresponding application PCT/CN2017/099359 filed Aug. 28, 2017; dated Mar. 6, 2018.

(Continued)

*Primary Examiner* — Eric T Oberly
(74) *Attorney, Agent, or Firm* — Cantor Colburn LLP (57) ABSTRACT

Provided are a sharing method and apparatus. The method acquires the first transmission parameter and the number of first channels supported by one network mode; calculates and obtains the first storage parameter corresponding to the one network mode according to the number of the first channels, the first transmission parameter and a preset calculation model; determines the first storage area satisfying the first storage parameter, and allocates the storage space for the first channels according to the first storage area. Further provided is a terminal.

14 Claims, 6 Drawing Sheets

(56) References Cited

U.S. PATENT DOCUMENTS

| | | | | |
|---|---|---|---|---|
| 8,966,174 B2* | 2/2015 | Motonaga | ............. | G06F 3/0619 |
| | | | | 711/114 |
| 2003/0026267 A1* | 2/2003 | Oberman | ................ | H04L 47/10 |
| | | | | 370/397 |
| 2010/0189061 A1* | 7/2010 | Campomaggio | ..... | H04W 52/34 |
| | | | | 370/329 |
| 2014/0059265 A1* | 2/2014 | Iyer | ........................... | G06F 9/46 |
| | | | | 710/313 |

OTHER PUBLICATIONS

European Search Report for corresponding application EP 17 91 0014; Report dated Dec. 17, 2020.

* cited by examiner

SHARING METHOD, APPARATUS, STORAGE MEDIUM, AND TERMINAL

CROSS-REFERENCES TO RELATED APPLICATIONS

This is a National Stage Application, filed under 35 U.S.C. 371, of International Patent Application No. PCT/CN2017/099359, filed on Aug. 28, 2017, which claims priority to a Chinese patent application No. 201710353185.8 filed on May 18, 2017, disclosures of which are incorporated herein by reference in their entireties.

TECHNICAL FIELD

The present disclosure relates to the field of data communications and, in particular, to a sharing method and apparatus, a storage medium and a terminal.

BACKGROUND

First Input First Output (FIFO) is an in-order execution method, i.e., a method in which an instruction that enters first is completed first and a next instruction is executed after the previous instruction is completed. At present, one FIFO often occupies one independent random access memory (RAM) in implementation of FIFO instructions. In a system supporting multiple network modes, the number of channels that need to support FIFO buffering varies with different network modes. In this case, it is necessary to configure the same number of FIFOs as the number of ports, and the same number of RAMs need to be occupied. Moreover, if a large FIFO channel space needs to be configured for a certain network mode of the system, the magnitude of each FIFO channel space in each network mode in the system needs to be set to the maximum FIFO space magnitude correspondingly.

For a system supporting multiple network modes, configuring the same number of FIFOs as the number of ports and occupying the same number of RAMs result in problems of a large number of address buses accessed by the RAM and complex wiring; moreover, setting the magnitude of each FIFO channel space in each network mode to the maximum FIFO space magnitude greatly wastes RAM resources.

SUMMARY

Embodiments of the present disclosure provide a sharing method and apparatus, which are able to determine a storage area and a storage space magnitude of one storage area shared by all channels in one network mode according to basic parameters corresponding to the network mode, and allocate a storage space for the channels in the network mode according to the storage area, so that all channels in the network mode share one storage space, thereby greatly reducing the number of the storage spaces, solving the problem of a large number of address buses accessed by the storage space, and effectively reducing the waste of storage space resources.

An embodiment of the present disclosure provides a sharing method, including: acquiring a first transmission parameter and the number of first channels supported by one network mode; calculating and obtaining a first storage parameter corresponding to the one network mode according to the number of first channels, the first transmission parameter and a preset calculation model; determining a first storage area satisfying the first storage parameter, and allocating a storage space for the first channels according to the first storage area.

An embodiment of the present disclosure provides a sharing apparatus. The apparatus includes an acquisition unit, a calculation unit, a determination unit and a configuration unit.

The acquisition unit is configured to acquire a first transmission parameter and the number of first channels supported by one network mode.

The calculation unit is configured to calculate and obtain the first storage parameter corresponding to the one network mode according to the number of first channels, the first transmission parameter and a preset calculation model.

The determination unit is configured to determine a first storage area satisfying the first storage parameter.

The configuration unit is configured to allocate a storage space for the first channels according to the first storage area.

An embodiment of the present disclosure provides another sharing method, including: acquiring a transmission parameter and a network mode supported by a terminal; allocating a shared storage space equal to the maximum storage capacity required in the network mode according to the transmission parameter; and performing a configuration on the allocated shared storage space according to a transmission parameter of a network mode currently used by the terminal.

An embodiment of the present disclosure provides a terminal. The terminal includes a processor, a memory storing instructions executable by the processor, a communication interface, and a bus for connecting the processor, the memory and the communication interface, wherein when the instructions are executed, the processor is configured to perform the following operations: acquiring a first transmission parameter and the number of first channels supported by one network mode; calculating and obtaining a first storage parameter corresponding to the one network mode according to the number of the first channels, the first transmission parameter and a preset calculation model; and determining a first storage area satisfying the first storage parameter, and allocating a storage space for the first channels according to the first storage area.

An embodiment of the present disclosure provides a terminal. The terminal includes a processor, a memory storing instructions executable by the processor, a communication interface, and a bus for connecting the processor, the memory and the communication interface, wherein when executed by the processor, the instructions cause the processor to implement the above one or more sharing methods.

An embodiment of the present disclosure provides a computer-readable storage medium, which stores programs and is applied to a terminal, where when executed by a processor, the programs cause the processor to implement the above one or more sharing methods.

It can be seen that the embodiments of the present disclosure provide a sharing method and apparatus. The method acquires a first transmission parameter and the number of first channels supported by one network mode; calculates and obtains a first storage parameter corresponding to the one network mode according to the number of the first channels, the first transmission parameter and a preset calculation model; determines a first storage area satisfying the first storage parameter, and allocates a storage space for the first channels according to the first storage area. That is, the embodiments of the present disclosure provide a sharing method and apparatus, which are able to determine a storage area and a storage space magnitude of one storage area shared by all channels in one network mode according to basic parameters corresponding to the network mode, and allocate a storage space for the channels in the network mode according to the storage area, so that all channels in the network mode share one storage space, thereby greatly reducing the number of the storage spaces, solving the problem of a large number of address buses accessed by the storage space, and effectively reducing the waste of storage space resources.

DETAILED DESCRIPTION

Technical solutions in embodiments of the present disclosure will be described clearly and completely in conjunction with the drawings in the embodiments of the present disclosure. It is to be understand that the embodiments described below are intended to describe and explain the present disclosure, and not to limit the present disclosure.

Embodiment One

Figure 1:
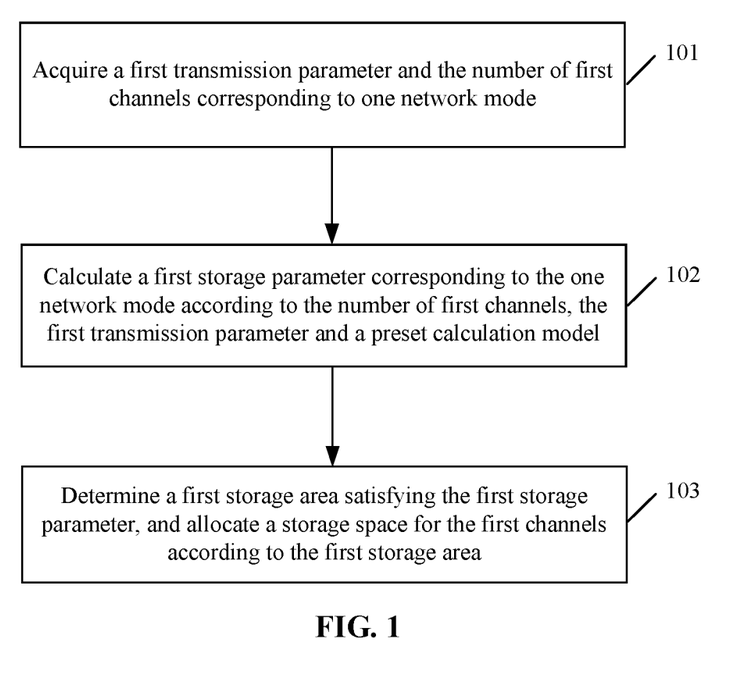
FIG. 1 is a flowchart one of implementation of a sharing method according to an embodiment of the present disclosure.

FIG. 1 is a flowchart 1 of implementation of a sharing method according to an embodiment of the present disclosure. As shown in FIG. 1, in this embodiment of the present disclosure, the sharing method of a storage space for the sharing apparatus may include the steps described below.

In step 101, a first transmission parameter and the number of first channels corresponding to one network mode are acquired.

In this embodiment of the present disclosure, the sharing apparatus may first acquire the first transmission parameter and the number of first channels corresponding to the one network mode. The number of first channels corresponding to the one network mode is a number of all interfaces in the network mode, and the interfaces are physical interfaces in the network mode, i.e., one physical interface may correspond to one data transmission channel in one network mode.

Optionally, in this embodiment of the present disclosure, the first transmission parameter may include a data transmission length and a data transmission width. Optionally, in this embodiment of the present disclosure, the data transmission length may be a preset data length of a data packet. For example, when performing data transmission, each physical interface in one network mode needs to transmit data in the form of an entire packet. Moreover, each physical interface is required to have an ability of buffering the data of the entire packet.

Therefore, the maximum data packet length that needs to be supported is 4 K bytes. Thus, the sharing apparatus may preset the data transmission length to 4 K bytes.

It is to be noted that, in this embodiment of the present disclosure, the data transmission width may be a preset bit width of data processing. For example, the sharing apparatus may preset the data transmission width to 32 bytes.

Optionally, in this embodiment of the present disclosure, the one network mode is at least one of network modes supporting multi-channel data buffering. That is, the one network mode is a network mode supporting multi-channel data buffering. Optionally, in this embodiment of the present disclosure, the one network mode may be a network mode supporting multi-channel FIFO buffering.

It is to be noted that, in this embodiment of the present disclosure, the at least one network mode needs to have the same data transmission width, i.e., a premise of the sharing method provided by the present disclosure is that the data transmission width of the at least one network mode is the same.

In step 102, according to the number of first channels, the first transmission parameter and a preset calculation model, a first storage parameter corresponding to the one network mode is calculated and obtained.

In this embodiment of the present disclosure, after acquiring the first transmission parameter and the number of first channels corresponding to the one network mode, the sharing apparatus may calculate and obtain a first storage parameter corresponding to the one network mode according to the number of first channels, the first transmission parameter, and a preset calculation model.

Optionally, in this embodiment of the present disclosure, after acquiring the first transmission parameter, i.e., the data transmission length and the data transmission width, the sharing apparatus may calculate, according to the data transmission length and the data transmission width, the magnitude of a storage space that each channel in the network mode needs to occupy. For example, when the number of first channels of one network mode is 4, if the data packet length of the first channel is 4 K bytes and the bit width of the data processing is 32 bytes, the sharing apparatus may calculate that the magnitude of the storage space that each channel in the network mode needs to occupy is 128×256 bits. As can be seen, in this embodiment of the present disclosure, the sharing apparatus may determine, according to the data transmission length and the data transmission width in one network mode, the magnitude of the storage space that each channel in the network mode needs to occupy.

Optionally, in this embodiment of the present disclosure, after calculating a buffering magnitude required by each channel in the network mode according to the data transmission length and the data transmission width, the sharing apparatus may further calculate, according to the magnitude of the storage space that each channel needs to occupy and the number of first channels, a total storage space magnitude required by the network mode, i.e., the first storage parameter corresponding to the network mode. For example, if the number of first channels of the network mode is 4, and when calculating that the magnitude of storage space that each channel needs to occupy in the network mode is 128×256 bits, the sharing apparatus may determine that the first storage parameter corresponding to the network mode is 512×256 bits, i.e., the total storage space magnitude required by the network mode is a sum of storage spaces that each channel needs to occupy.

It is to be noted that, in this embodiment of the present disclosure, the first storage parameter may represent the storage space magnitude of one storage area shared by all channels in one network mode.

In step 103, a first storage area satisfying the first storage parameter is determined, and a storage space is allocated for the first channels according to the first storage area.

In this embodiment of the present disclosure, after calculating and obtaining the first storage parameter corresponding to the one network mode according to the number of the first channels, the first transmission parameter and a preset calculation model, the sharing apparatus may determine the first storage area satisfying the first storage parameter, and allocate the storage space for the first channels according to the first storage area.

Optionally, in this embodiment of the present disclosure, the first storage area is a storage area shared by all channels in the network mode. Optionally, in this embodiment of the present disclosure, a storage module corresponding to the first storage area may be a RAM.

Optionally, in this embodiment of the present disclosure, the sharing apparatus may determine the first storage area satisfying the first storage parameter according to the first storage parameter, and perform address initialization allocation on the first storage area in the network mode according to the number of first channels. That is, after configuring the first storage area according to the first storage parameter, the sharing apparatus may perform address initialization on the first storage area to enable all interfaces in the network mode to access a storage module corresponding to the first storage area.

It is to be noted that, in this embodiment of the present disclosure, when performing the address initialization allocation on the first storage area in the network mode according to the number of first channels, the sharing apparatus may perform the address initialization allocation on the first storage area according to a tie allocation principle. For example, when a network mode has four interfaces, i.e., the number of corresponding first channels is four, and the sharing apparatus determines that the first storage parameter of the network mode is 512×256 bits, the sharing apparatus may select a RAM with a storage depth of 512 as the storage module corresponding to the first storage area. Then the sharing apparatus may split the corresponding RAM into four according to the number of first channels. Since the depth of the RAM is 512, and the RAM is spilt into four FIFOs, and a corresponding depth of each FIFO is 128. Optionally, for a first FIFO, a start address read and written through the FIFO is 0, and an end address read and written through the FIFO is 127; for a second FIFO, a start address read and written through the FIFO is 128, and an end address read and written through the FIFO is 255; for a third FIFO, a start address read and written through the FIFO is 256, and an end address read and written through the FIFO is 383; and for a third FIFO, a start address read and written through the FIFO is 384, and an end address read and written through the FIFO is 511. According to initial values of the start and end addresses corresponding to the four buffer FIFOs, address initialization is performed for the first storage space to ensure that each FIFO jumps in a corresponding RAM address space.

The embodiment of the present disclosure provides a sharing method. The method acquires the first transmission parameter and the number of first channels supported by one network mode; calculates and obtains the first storage parameter corresponding to the one network mode according to the number of the first channels, the first transmission parameter and a preset calculation model; determines the first storage area satisfying the first storage parameter, and allocates the storage space for the first channels according to the first storage area. That is, the embodiment of the present disclosure provides a sharing method and apparatus, which are able to determine a storage area and a storage space magnitude of a storage area shared by all channels in a network mode according to basic parameters corresponding to the network mode, and allocate the storage space for the channels in the network mode according to the storage area, so that all channels in the network mode share one storage space, thereby greatly reducing the number of the storage spaces, solving the problem of a large number of address buses accessed by the storage space, and effectively reducing the waste of storage space resources.

Embodiment Two

Figure 2:
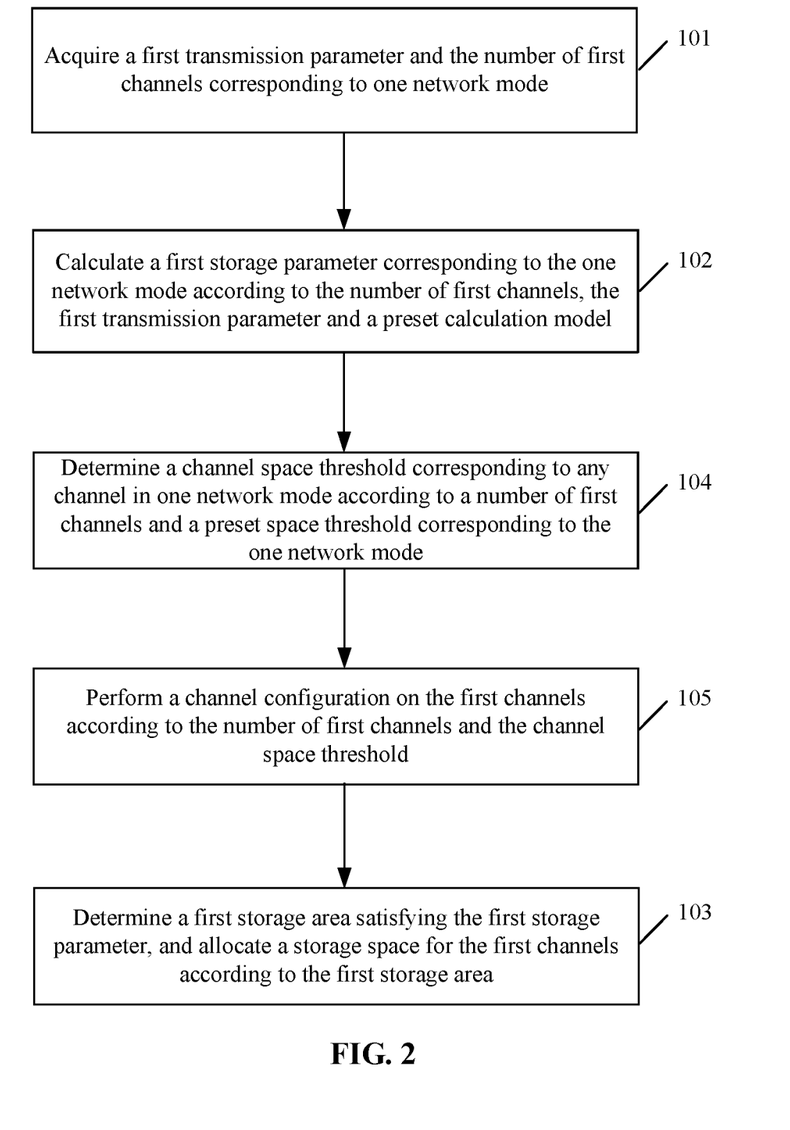
FIG. 2 is a flowchart two of implementation of a sharing method according to an embodiment of the present disclosure.

FIG. 2 is a flowchart two of implementation of a sharing method according to an embodiment of the present disclosure. As shown in FIG. 2, based on embodiment one, before a sharing apparatus determines a first storage area satisfying a first storage parameter, i.e., before the step 103, the method for the sharing apparatus to perform initialization configuration on any channel in one network mode may include the steps described below.

In step 104, a channel space threshold corresponding to any channel in one network mode is determined according to the number of first channels and a preset space threshold corresponding to the one network mode.

In this embodiment of the present disclosure, the sharing apparatus may determine the channel space threshold corresponding to any channel in one network mode according to the number of first channels and the preset space threshold corresponding to the one network mode.

Optionally, in this embodiment of the present disclosure, the sharing apparatus may preset the preset space threshold, and then determine the channel space threshold corresponding to any channel in one network mode according to the number of first channels and the preset space threshold corresponding to the one network mode. Optionally, the sharing apparatus may preset the preset space threshold according to needs of designing a logic processing.

In step 105, a channel configuration is performed on the first channels according to the number of first channels and the channel space threshold.

In this embodiment of the present disclosure, after determining the channel space threshold corresponding to any channel in one network mode according to the number of first channels and the preset space threshold corresponding to the one network mode, the sharing apparatus may perform the channel configuration according to the number of first channels and the channel space threshold. For example, when the number of first channels is 4, the sharing apparatus may configure 4 FIFOs for data buffering.

The embodiment of the present disclosure provides a sharing method, which is able to determine a storage area and a storage space magnitude of one storage area shared by all channels in one network mode according to basic parameters corresponding to the network mode, and allocate a storage space for the channels in the network mode according to the storage area, so that all channels in the network mode share one storage space, thereby greatly reducing the number of the storage spaces, solving the problem of a large number of address buses accessed by the storage space, and effectively reducing the waste of storage space resources.

Embodiment Three

Figure 3:
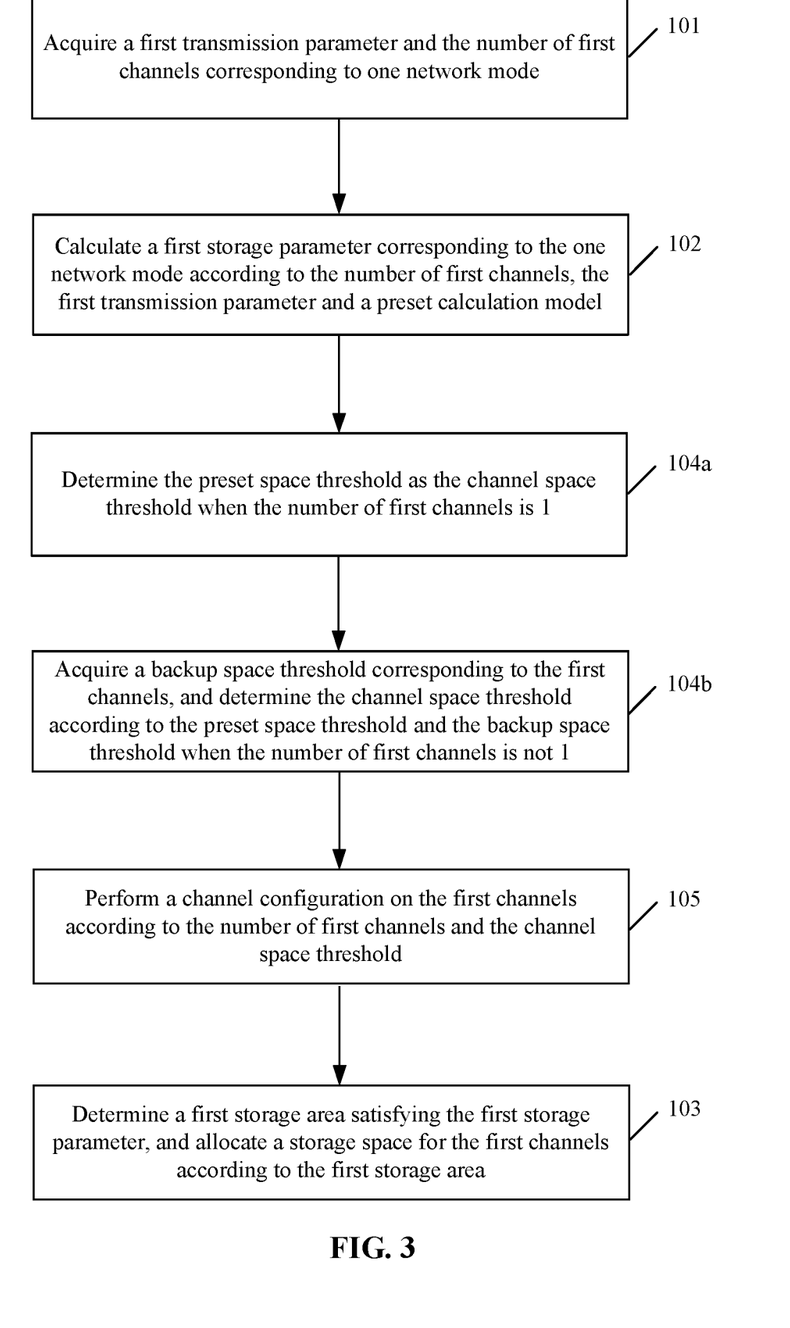
FIG. 3 is a flowchart three of implementation of a sharing method according to an embodiment of the present disclosure.

FIG. 3 is a flowchart three of implementation of a sharing method according to an embodiment of the present disclosure. As shown in FIG. 3, in this embodiment of the present disclosure, a method for a sharing apparatus to determine a channel space threshold corresponding to any channel in one network mode according to the number of first channels and a preset space threshold corresponding to the one network mode may include the steps described below.

In step 104a, when the number of first channels is 1, the preset space threshold is determined as the channel space threshold.

In this embodiment of the present disclosure, when the number of first channels is 1, i.e., when the sharing apparatus needs to configure only one data buffering channel, the sharing apparatus may determine the preset space threshold as the channel space threshold of the one data buffering channel. For example, when the number of first channels corresponding to one network mode is 1, and the preset channel space threshold is 20, the sharing apparatus configures one FIFO for data buffering, and the sharing apparatus may determine the channel space threshold of this FIFO as 20.

In step 104b, when the number of first channels is not 1, a backup space threshold corresponding to the first channels is acquired, and the channel space threshold is determined according to the preset space threshold and the backup space threshold.

In this embodiment of the present disclosure, when the number of first channels is not 1, i.e., when the sharing apparatus needs to configure multiple data buffering channel, the sharing apparatus needs to consider an unused space when determining the channel space threshold. Optionally, in this embodiment of the present disclosure, the sharing apparatus may first acquire the backup space threshold corresponding to the first channel in the network mode, and then the sharing apparatus may determine the channel space threshold corresponding to any channel in one network mode according to the preset space threshold and the backup space threshold. The backup space threshold may represent an available storage space in the above multiple channels when data buffering is performed in only one channel.

Optionally, in this embodiment of the present disclosure, if the number of first channels corresponding to the one network mode is 4, the first storage parameter of the network mode is 512×256 bits, and the preset channel space threshold is 20, then the sharing apparatus configures 4 FIFOs for the data buffering. That is, one FIFO only uses one quarter of the first storage parameter, and the sharing apparatus may acquire the backup space threshold corresponding to the number of first channels in the network mode to be 384 according to the number of first channels and the first storage parameter in the network mode, then the sharing apparatus may determine the channel space threshold of each FIFO in the network mode to be (384+20).

According to the above description, through the above steps 104a-104b, when the number of first channels is 1, the sharing apparatus may determine the preset space threshold as the channel space threshold; when the number of first channels is not 1, the sharing apparatus may acquire the backup space threshold corresponding to the number of first channels, and determine the channel space threshold according to the preset space threshold and the backup space threshold, so that all channels in the network mode share one storage space, thereby greatly reducing the number of the storage spaces, solving the problem of a large number of address buses accessed by the storage space, and effectively reducing the waste of storage space resources.

Embodiment Four

Figure 4:
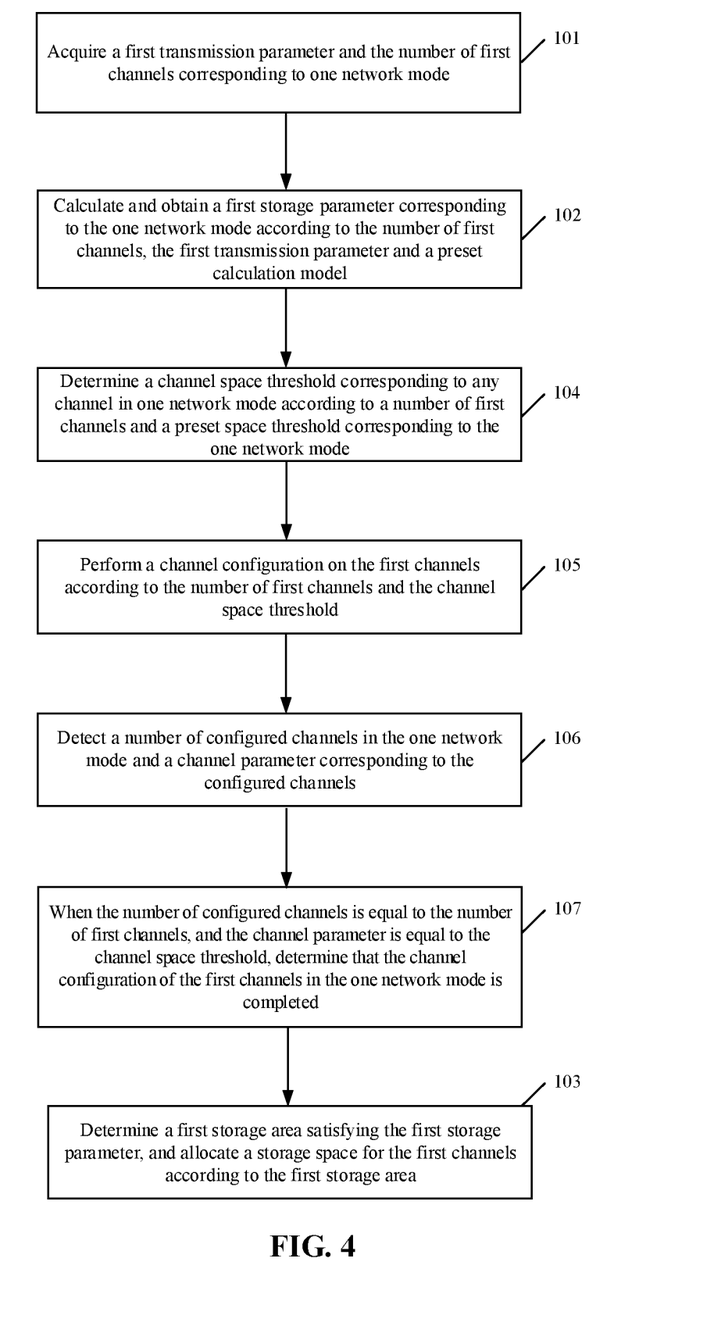
FIG. 4 is a flowchart four of implementation of a sharing method according to an embodiment of the present disclosure.

FIG. 4 is a flowchart four of implementation of a sharing method according to an embodiment of the present disclosure. As shown in FIG. 4, in this embodiment of the present disclosure, after a sharing apparatus performs initialization configuration on any channel in the network mode according to the number of first channels and a channel space threshold, i.e. after the step 105, and before performing address initialization on a first storage area according to the number of first channels, i.e., before the step 103, a method for the sharing apparatus determining whether the initialization configuration is completed may include the steps described below.

In step 106, a number of configured channels in the one network mode and a channel parameter corresponding to the configured channels are detected.

In this embodiment of the present disclosure, after performing the channel configuration on the first channels according to the number of first channels and the channel space threshold, the sharing apparatus may first detect the number of configured channels in the one network mode and the channel parameter corresponding to the configured channels.

Optionally, in this embodiment of the present disclosure, the sharing apparatus may detect the number of configured channels in the one network mode and the channel parameter corresponding to the configured channels by using multiple methods. For example, the sharing apparatus may correspondingly read a status register through a central processing unit (CPU) operation, detects the number of configured channels and the channel parameter corresponding to the configured channels.

In step 107, when the number of configured channels equals to the number of first channels, and the channel parameter equals to the channel space threshold, the channel configuration of the first channels in the one network mode is determined to be completed.

In this embodiment of the present disclosure, after detecting the number of configured channels and the channel parameter corresponding to the configured channels, the sharing apparatus may compare the number of configured channels, the number of first channels, the channel parameter corresponding to the configured channels and the channel space threshold. When the number of configured channels equals to the number of first channels, and the channel parameter equals to the channel space threshold, the sharing apparatus may determine that the channel configuration of the first channels in the one network mode is completed.

The embodiment of the present disclosure provides a sharing method, which is able to determine a storage area and a storage space magnitude of one storage area shared by all channels in one network mode according to basic parameters corresponding to the network mode, and allocate a storage space for the channels in the network mode according to the storage area, so that all channels in the network mode share one storage space, thereby greatly reducing the number of the storage spaces, solving the problem of a large number of address buses accessed by the storage space, and effectively reducing the waste of storage space resources.

Embodiment Five

Figure 5:
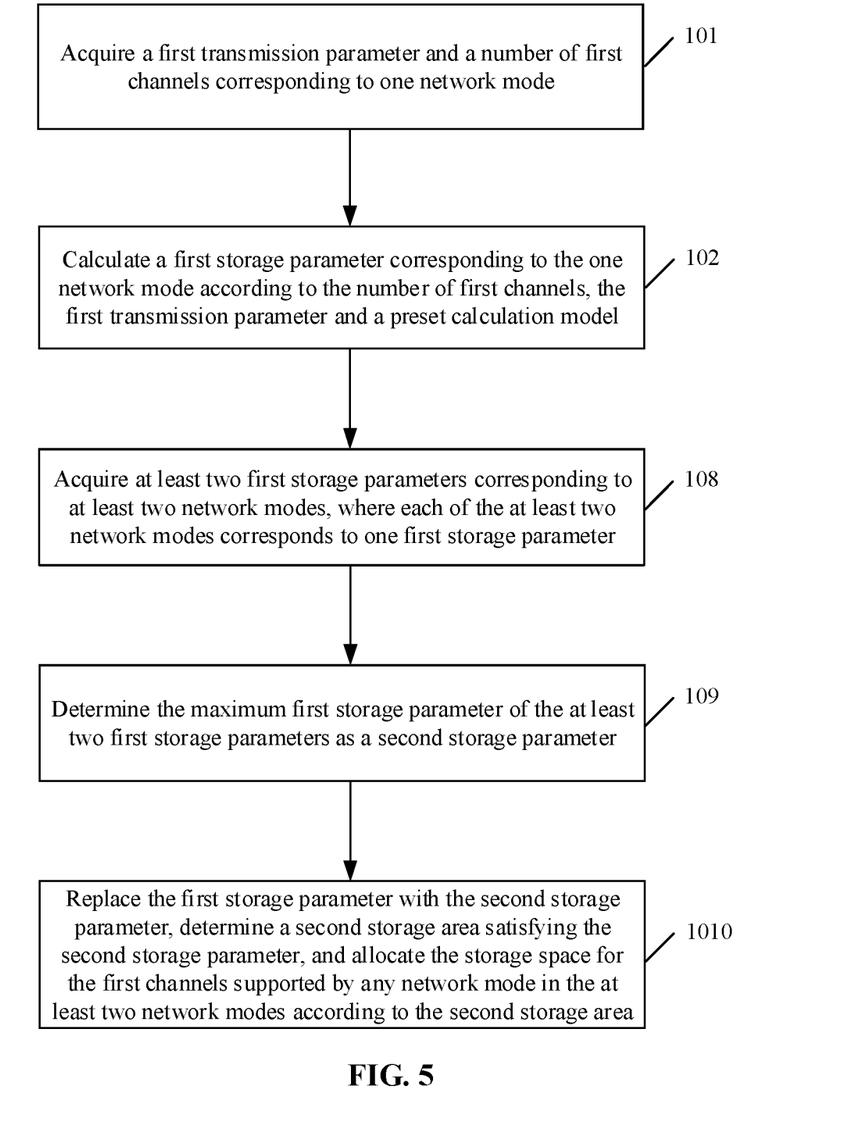
FIG. 5 is a flowchart five of implementation of a sharing method according to an embodiment of the present disclosure.

FIG. 5 is a flowchart five of implementation of a sharing method according to an embodiment of the present disclosure. As shown in FIG. 5, based on embodiments one to four, in this embodiment of the present disclosure, after the sharing apparatus calculates and obtain a first storage parameter corresponding to one network mode according to the number of first channels, a first transmission parameter and a preset calculation model, and the step 102, the sharing method of a storage space for the sharing apparatus may include the steps described below.

In step 108, at least two first storage parameters corresponding to at least two network modes are acquired. Each of the at least two network modes corresponds to one first storage parameter.

In this embodiment of the present disclosure, after the sharing apparatus calculates and obtains the first storage parameter corresponding to the one network mode according to the number of first channels, the first transmission parameter and a preset calculation model, the sharing apparatus may acquire, according to the above steps 101 and 102, at least two first storage parameters corresponding to at least two network modes, where each of the at least two network modes corresponds to one first storage parameter.

Optionally, in this embodiment of the present disclosure, the sharing apparatus may acquire the first storage parameter corresponding to each of the at least two network modes by the above steps 101 and 102. In this embodiment of the present disclosure, it is to be noted that since the first transmission parameter and the number of first channels corresponding to different network modes in the at least two network modes may be different; therefore, at least two first transmission parameters corresponding to different network modes and acquired to the sharing apparatus may also be different.

In step 109, the maximum first storage parameter of the at least two first storage parameters is determined as a second storage parameter.

In this embodiment of the present disclosure, after the sharing apparatus acquires the at least two first storage parameters corresponding to the at least two network modes, the sharing apparatus may determine the maximum first storage parameter of the at least two first storage parameters corresponding to the at least two network modes as the second storage parameter.

It is to be noted that, in this embodiment of the present disclosure, the second storage parameter represents a storage space magnitude of a storage area shared by all channels in any network mode of the at least one network mode.

Optionally, in this embodiment of the present disclosure, the sharing apparatus may compare the first storage parameters corresponding to each network mode in the at least one network mode, so that the maximum first storage parameter may be determined, and the sharing apparatus may determine the first storage parameter as the second storage parameter.

It is to be noted that, the sharing apparatus determines the maximum first storage parameter as the second storage parameter, thus ensuring that the second storage parameter satisfies data buffering requirement of any network mode in the at least two network modes, so that the storage space magnitude shared by the at least two network modes may be a storage module of the second storage parameter. For example, if a network mode A and a network mode B exist in a system, the shared apparatus calculates that a first storage parameter corresponding to the network mode A is 512×256 bits, and a first storage parameter corresponding to the network mode B is 128×256 bits, then the sharing apparatus may determine the first storage parameter corresponding to the network mode A is the second storage parameter, so that the network mode A and the network mode B may share one RAM with a storage magnitude of 512×256 bits.

In this embodiment of the present disclosure, optionally, after the sharing apparatus determines the maximum first storage parameter of the at least two first storage parameters corresponding to the at least two network modes as the second storage parameter, i.e. the step 109, the sharing method of a storage space for the sharing apparatus further includes the steps described below.

In step 1010, the first storage parameter is replaced with the second storage parameter, a second storage area satisfying the second storage parameter is determined, and a storage space is allocated for first channels supported by any one of the at least two network modes according to the second storage area.

In this embodiment of the present disclosure, after the sharing apparatus determines the maximum first storage parameter of the at least two first storage parameters corresponding to the at least two network modes as the second storage parameter, the first storage parameter may be replaced with the second storage parameter, then a second storage area satisfying the second storage parameter is determined, and a storage space is allocated for first channels supported by any one of the at least two network mode according to the second storage area.

Optionally, in this embodiment of the present disclosure, the sharing apparatus may determine the second storage area satisfying the second storage parameter according to the second storage parameter, and perform address initialization on the second storage area according to the number of first channels corresponding to any network mode. That is, after configuring the second storage area according to the second storage parameter, the sharing apparatus may perform address initialization on the second storage area to enable all interfaces in the network mode to access a storage module corresponding to the second storage area.

It is to be noted that, in this embodiment of the present disclosure, when performing the address initialization allocation on the second storage area in the network mode according to the number of first channels, the sharing apparatus may perform the address initialization allocation on the second storage area according to a tie allocation principle. For example, when a network mode has four interfaces, i.e., the number of corresponding first channels is four, and the sharing apparatus determines that the first storage parameter of the network mode is 512×256 bits, the sharing apparatus may select a RAM with a storage depth of 512 as the storage module corresponding to the second storage area. Then the sharing apparatus may split the corresponding RAM into four according to the number of first channels. Since the depth of the RAM is 512, and is divided into four FIFOs, and a corresponding depth of each FIFO is 128. Optionally, for a first FIFO, a start address read and written through the FIFO is 0, and an end address read and written through the FIFO is 127; for a second FIFO, a start address read and written through the FIFO is 128, and an end address read and written through the FIFO is 255; for a third FIFO, a start address read and written through the FIFO is 256, and an end address read and written through the FIFO is 383; and for a third FIFO, a start address read and written through the FIFO is 384, and an end address read and written through the FIFO is 511. According to initial values of the start and end addresses corresponding to the four buffer FIFOs, the address initialization is performed for the second storage space to ensure that each FIFO jumps in a corresponding RAM address space.

The embodiment of the present disclosure provides a sharing method and apparatus, which are able to determine a storage space magnitude of a storage area shared by all channels in any network mode in the at least two network modes according to basic parameters corresponding to the at least two network mode, and perform the address initialization on the shared storage area according to all interfaces in any network mode, so that all channels of any network mode in the at least two network mode may share one storage space, thereby greatly reducing the number of the storage spaces, solving the problem of a large number of address buses accessed by the storage space, and effectively reducing the waste of storage space resources.

Embodiment Six

Figure 6:
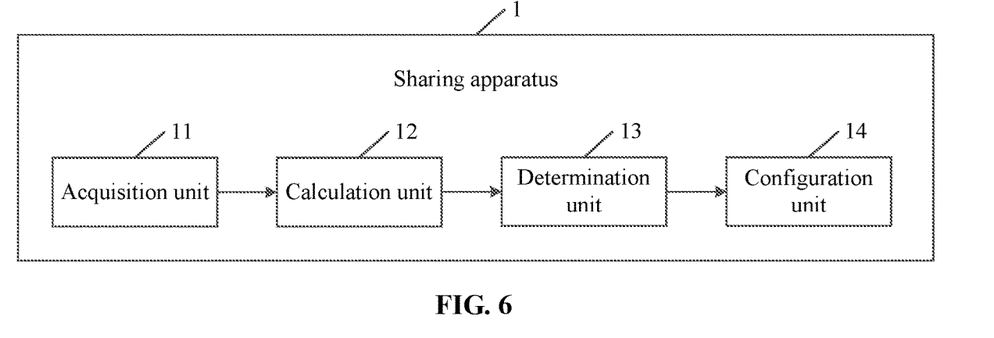
FIG. 6 is a structural diagram one of a sharing apparatus according to an embodiment of the present disclosure.

FIG. 6 is a structural diagram one of a sharing apparatus according to an embodiment of the present disclosure. As shown in FIG. 6, the sharing apparatus 2 provided by the embodiment of the present disclosure includes an acquisition unit 11, a calculation unit 12, a determination unit 13 and a configuration 14.

The acquisition unit 11 is configured to acquire a first transmission parameter and the number of first channels supported by one network mode.

The calculation unit is configured to calculate and obtain the first storage parameter corresponding to the one network mode according to the number of first channels, the first transmission parameter and a preset calculation model.

The determination unit 13 is configured to determine a first storage area satisfying the first storage parameter.

The configuration unit 14 is configured to allocate a storage space for the first channels according to the first storage area.

In this embodiment of the present disclosure, optionally, the determination unit 13 is further used for determining, before determining the first storage area satisfying the first storage parameter, a channel space threshold corresponding to the first channels according to the number of first channels and a preset space threshold corresponding to the one network mode.

The configuration unit 14 is further configured to perform a channel configuration on the first channels according to the number of first channels and the channel space threshold.

In this embodiment of the present disclosure, optionally, the determination unit 13 is configured to determine the preset space threshold as the channel space threshold when the number of first channels is 1.

The acquisition unit 11 is configured to acquire a backup space threshold corresponding to the first channels when the number of first channels is not 1.

The determination unit 13 is further configured to determine the channel space threshold according to the preset space threshold and the backup space threshold.

Figure 7:
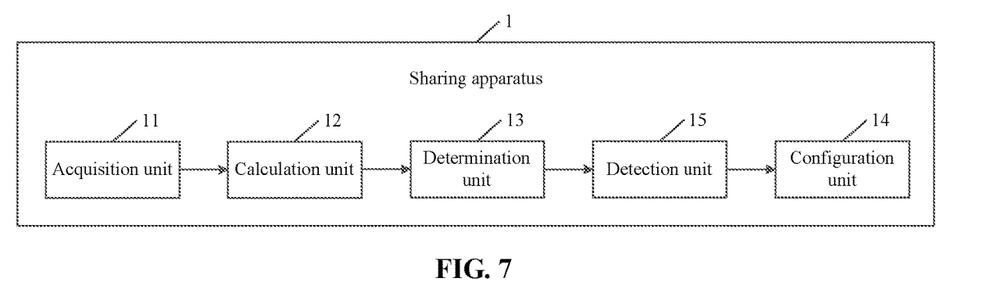
FIG. 7 is a structural diagram two of a sharing apparatus according to an embodiment of the present disclosure.

FIG. 7 is a structural diagram two of a sharing apparatus according to an embodiment of the present disclosure. As shown in FIG. 7, the sharing apparatus 2 provided by the embodiment of the present disclosure includes a detection unit 15.

The detection unit 15 is configured to detect, after performing the channel configuration on the first channels according to the number of first channels and the channel space threshold and before allocating the storage space for the first channels according to the first storage area, a number of configured channels in the one network mode, and a channel parameter corresponding to the configured channels.

A determination unit 13 is further configured to determine that, when the number of configured channels equals to the number of first channels and the channel parameter equals to the channel space threshold, the channel configuration of the first channels in the one network mode is completed.

In an embodiment of the present disclosure, optionally, the acquisition unit 11 is further configured to, after calculating and obtaining the first storage parameter corresponding to the one network mode according to the number of first channels, the first transmission parameter and a preset calculation model, acquire at least two first storage parameters corresponding to at least two network modes, where each of the at least two network modes corresponds to one first storage parameter.

The determination unit 13 is further used for determining the maximum first storage parameter of the at least two first storage parameters as a second storage parameter.

In this embodiment of the present disclosure, optionally, the determination unit is further configured to, after determining the maximum first storage parameter of the at least two first storage parameters as the second storage parameter, replace the first storage parameter with the second storage parameter, and determine a second storage area satisfying the second storage parameter.

The configuration unit 14 is further used for allocating a storage space for first channels supported by any one of the at least two network modes according to the second storage area.

An embodiment of the present disclosure provides a sharing method, including: acquiring a transmission parameter and a network mode supported by a terminal; allocating a shared storage space having a capacity equal to the maximum storage capacity required in the network mode according to the transmission parameter; and performing a configuration on the allocated shared storage space according to a transmission parameter of a network mode currently used by the terminal.

The method is applied to a terminal which may support or use multiple network modes. The capacity of a storage space for which FIFO needs to be configured varies with different network modes used by the terminal. In this embodiment, to solve the problem of wasting a large number of storage resources when a storage space is configured for each network mode separately, the following operations are performed: a shared storage space having a capacity equal to the maximum storage capacity required in the network mode is determined according to transmission parameters and channel data required by multiple network modes supported by the terminal; and the shared storage space is dynamically configured according to the currently used network mode. In this way, the sharing of the shared storage space is achieved, and compared with the separate configuration in which a storage space is configured for each network mode separately, the required storage space is reduced and effective utilization rate of the storage space is improved. When the storage space is a RAM, the storage capacity of the RAM is saved and the effective utilization rate of the RAM is improved.

In addition, in this embodiment, not only a storage space is shared, but also resources such as a storage controller and a bus connecting a processor to the shared storage space are shared.

Optionally, performing the configuration on the allocated storage space according to the transmission parameter of the network mode currently used by the terminal includes: determining a storage parameter of the currently used network mode according to the transmission parameter; according to the storage parameter, selecting at least part of storage apace from the shared storage apace and configuring the at least part of storage apace to be the application storage space.

The storage parameter includes a depth and a width of the required storage space, such as the depth and the width of the required RAM.

The capacity of the shared storage space is the maximum storage capacity required in the multiple network modes supported by the terminal. The storage capacity required by the currently used network mode by the terminal is apparently equal to or smaller than the shared storage space. Therefore, when the dynamic configuration is performed, the shared storage space is configured according to the currently used network mode. The configuration here includes selecting at least part of the storage apace as an application storage space of the currently used network mode. The application storage space is a buffer space configured for data transmission in the current network mode.

Optionally, the transmission parameter includes: at least one of a data transmission length or a data transmission width, performing the configuration on the allocated storage space according to the transmission parameter of the network mode currently used by the terminal includes: determining a depth of the application storage space according to the data transmission length and the data transmission width; determining a width of the application storage space according to the data transmission width; based on the depth and the width, selecting at least part of storage apace from the shared storage apace to be the application storage space. For example, the width of the application storage space may be a width of the RAM; and the depth may be a depth of the RAM.

The data transmission length may be a length of a single data packet transmitted in the currently used network mode; the data transmission width may be an interface width of a physical interface for performing the data transmission in the currently used network mode.

Optionally, the method further includes: according to a number of channels required by the currently used network mode, allocating the application storage space as a substorage space equal to the number of channels.

Optionally, allocating the shared storage space equal to the maximum storage capacity required in the network mode according to the transmission parameter includes: allocating a shared storage space equal to the maximum storage capacity required in the network mode according to the transmission parameter and a channel gap; and when multiple channels corresponding to one network mode is provided, the channel here may be a FIFO. The channel gap may be configured between these channels. These channel gaps also need to occupy a part of the storage capacity.

performing the configuration on the allocated shared storage space according to the transmission parameter of the network mode currently used by the terminal includes: according to the transmission parameter, the channel gaps and the number of channels required by the currently used network mode, selecting at least part of the storage apace from the shared storage space and configuring the at least part of storage apace to be the application storage space of the currently used network mode; and configuring channels equal to the number of required channels in the application storage space according to the channel gap, where a storage gap between different channels are not less than the channel gaps.

For example, the number of channels required by the currently used network mode is 4, and a gap between two channels is 20 storage units. When a storage address corresponding to each channel is configured in the application storage space, 20 storage units are needed between an end storage address of a channel and a start storage address of another channel.

In some embodiments, the method further includes: configuring a channel controller according to the depth of the channel required by multiple network modes, where a controllable storage depth of the channel controller is not less than the maximum depth of the channel required by the multiple network modes.

Two examples are provided below in conjunction with the above embodiments.

Example One

It is assumed that an ASIC that needs to support an XGMII mode and a QSGMII mode is provided. The XGMII mode needs to support a whole giant package (16 KB) while the QSGMII mode needs to support a packet with the maximum length of 4 KB bytes, and the data transmission width is 32 B.

The XGMII is an abbreviation of 10 Gigabit Media Independent Interface.

The QSGMII is an abbreviation of Quad Serial Gigabit Media Independent Interface.

The first step is to calculate a required RAM specification based on storage requirements. The RAM specification here may be a shared memory specification.

The XGMII mode has one physical interface and needs to support the transmission of a large data packet with a data transmission length of 16 KB. Thus, the required FIFO buffer depth is 16 KB/32 B=512.

The QSGMII mode needs to support four physical interfaces, and needs to support the transmission of a data packet with a data transmission length of only 4 KB. Thus, the FIFO buffer depth required by each physical interface is 4 KB/32 B=128.

Both network modes have a data transmission width of 32 B, i.e., 256 bits. In this example, the required RAM depth is 512, i.e., the RAM specification is 512×256, and the numbers of split channels that need to be supported are 1 and 4. The FIFO is one type of the above channels.

In short, the first step is to calculate the transmission parameters of different network modes to determine the specification of the shared storage space.

The second step is to initialize (dynamically configure) the RAM according to an application scenario (i.e., the currently used network mode).

If in the XGMII mode, the number of channels split from the RAM is set to 1, and after the setting, an initial address of the RAM is read and written, and a read/write control logic is initialized.

If in the QSGMII mode, the number of channels split from the RAM is set to 4, and after the setting, a read/write address and the read/write control logic of the RAM is initialized.

If a search matching module starts searching after receiving a signal for starting the register, the search matching module searches from an address 0 and sends address information 0 to the RAM.

The third step is to initially configure the FIFO gap value.

It is to be noted that the depth of the first FIFO is variable, the XGMII needs to support a depth of 512, and the QSGMII needs to support a depth of 128. For resource saving, it is feasible to use only one FIFO controller having a depth of 512. When in the QSMII mode, a channel gap GAP0 of the FIFO is set to 384 plus GAP.

The fourth step to perform normal data transmission after the above configuration is determined.

Example Two

The terminal may support interfaces of the XGMII and QSGMII network modes.

First, according to different application scenarios, first the number of FIFOs that requires splitting and the required RAM magnitude applied to this example are calculated.

(1) An XGMII interface format corresponding to the XGMII mode has only one physical interface. Data transmission needs to be transmitted in a whole packet, and requires the ability of buffering the data of the entire packet in the design. The required supported maximum data packet length is 16 K bytes. A bit width of data processing in the design is 32 bytes. Thus, it is calculated that the required capacity of the buffer RAM in the design is 512×256 bits.

(2) A QSMII interface corresponding to the QSMII mode has four physical interfaces. Data transmission of each physical interface needs to be transmitted in a whole packet, and requires the ability of buffering the data of the entire packet in the design. The maximum data packet length that needs to be supported is 4 K bytes.

The bit width of the data processing during transmission (i.e., the data transmission width) is 32 bytes. Thus, it is calculated that the required capacity magnitude is 128×256 bits and the total capacity of the buffer RAM is 512×256 bits.

According to the above calculation, with the scheme of this example, the RAM required in configuration of one shared storage space is 512×256 bits (the depth is 512 and the bit width is 256 bits).

In application, according to the currently used network mode, the RAM is configured according to two cases in which the number of FIFOs is 1 or 4.

Second, according to different application scenarios, the shared storage space (i.e., a reserved RAM) is configured.

(1) When the method is applied in the XGMII mode, only one physical interface is provided in this case. The required capacity of the buffer RAM is 512×256 bits according to the above calculation result. The number of FIFOs spilt from the RAM is 1. An almost-full threshold corresponding to the FIFO is set to 20 (the almost-full threshold may be adjusted according to requirements of designing the logic processing). After the configuration is completed, an address initialization operation is performed on the RAM next.

(2) When the method is applied in the QSGMII mode, four physical interfaces are provided in this case. The required capacity of the buffer RAM is 128×256 bits according to the above calculation result. Since the case where the number of FIFOs spilt from the RAM is 1 and the case where the number of FIFOs spilt from the RAM is 4 are provided, a FIFO controller is compatible with the case of 1 FIFO and the case of 4 FIFOs.

In the QSGMII application scenario, the number of FIFOs spilt from the RAM is 4 and an unused space needs to be considered for the almost-full threshold of the FIFO controller. Splitting into 4 is equivalent to using ¼ of the FIFO controller, so the threshold of the FIFO controller is set to (384+20). 384 is the magnitude of the unused space and is a fixed value; 20 is the almost-full threshold needs to be reserved for system processing (the almost-full threshold may be adjusted according to requirements of designing the logic processing). After the configuration is completed, an address initialization operation is performed on the RAM next.

Third, whether a corresponding initial set value is correct is checked according to different application scenarios.

(1) When the method is applied in the XGMII mode, only one physical interface is provided in this case. The number of FIFOs spilt from the RAM is 1, and the corresponding almost-full threshold of the FIFO is 20.

Through the operation of the central processing unit (CPU), a configuration register is read and the above two set values are determined to be correctly set.

(2) When the method is applied in the QSGMII mode, four physical interfaces are provided in this case. The number of FIFOs spilt from the RAM is 4, and the corresponding almost-full threshold of the FIFO is (384+20).

Through the operation of the central processing unit (CPU), the configuration register is read, and the above two set values are determined to be correctly set.

Fourth, a soft reset system performs an initialization operation on a RAM read/write address according to the configuration information.

(1) When the method is applied in the XGMII mode, only one physical interface is provided in this case. The number of FIFOs spilt from the RAM is 1, and the corresponding almost-full threshold of the FIFO is 20.

The depth of the RAM is 512 and the RAM is split into 1 FIFO. Thus, initially, the start address read and written through the FIFO is 0 and the end address read and written through the FIFO is 511.

According to the above initial values, an initial operation is performed on read/write address of the FIFO controller.

(2) When the method is applied in the QSGMII mode, four physical interfaces need to be supported in this case. The RAM is spilt into 4 FIFOs, and the corresponding almost-full threshold of the FIFOs is (384+20).

The depth of the RAM is 512 and 4 spilt FIFOs are provided. Thus, the depth corresponding to each FIFO is 128.

For a first FIFO, the start address read and written through the FIFO is 0 and the end address read and written through the FIFO is 127.

For a second FIFO, the start address read and written through the FIFO is 128, and the end address read and written through the FIFO is 255.

For a third FIFO, the start address read and written through the FIFO is 256, and the end address read and written through the FIFO is 383.

For a fourth FIFO, the start address read and written through the FIFO is 384, and the end address read and written through the FIFO is 511.

According to the initial values of the start and end addresses corresponding to the 4 buffer FIFOs, an initialization operation is performed for the 4 FIFO controllers to ensure that each FIFO jumps in a corresponding RAM address space.

Finally, according to different application scenarios, configuration of the shared storage space is determined. After the initial configuration of the split FIFO read/write addresses is completed, normal data transmission can be performed.

Figure 8:
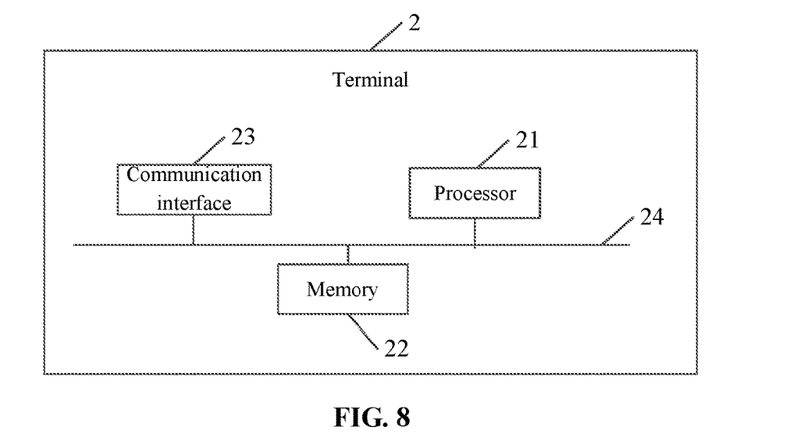
FIG. 8 is a structural diagram of a terminal according to an embodiment of the present disclosure.

FIG. 8 is a structural diagram of a terminal according to an embodiment of the present disclosure. In practical applications, based on a same inventive concept of embodiments 1 to 5, as shown in FIG. 8, a terminal 2 may include a processor 21, a memory 22 storing instructions executable by the processor 21, a communication interface 23, and a bus 24 for connecting the processor 21, the memory 22 and the communication interface 23.

In this embodiment of the present disclosure, the terminal 2 is a physical apparatus corresponding to the sharing apparatus 1. Therefore, an acquisition unit 11, a calculation unit 12, a determination unit 13, a configuration unit 14, and a detection unit 15 in the sharing apparatus 1 may be implemented by the processor 21 located on the terminal 2. The processor 21 may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It is understandable that for different apparatus, the electronic device for implementing the functions of the preceding processor may be other devices, which is not specifically limited in the embodiments of the present disclosure. The terminal 2 may also include the memory 22, which may be connected to the processor 21, where the memory 22 is used for storing executable program codes, the program codes include computer operation instructions, and the memory 22 may include a high-speed RAM, and may also include a non-volatile memory, such as at least one disk memory.

In this embodiment of the present disclosure, the bus 24 is used for connecting the communication interface 23, the processor 21 and the memory 22 for communication among these devices.

In this embodiment of the disclosure, the memory 22 is used for storing instructions and data.

The processor 21 is configured to acquire the first transmission parameter and the number of first channels supported by one network mode; calculating and obtaining the first storage parameter corresponding to the one network mode according to the number of the first channels, the first transmission parameter and a preset calculation model; determining the first storage area satisfying the first storage parameter, and allocating the storage space for the first channels according to the first storage area.

In practical applications, the memory 22 may be a first volatile memory, such as a first random access memory (RAM); or may be a first non-volatile memory, such as a first read-only memory (ROM), a first flash memory, a hard disk drive (HDD), a solid-state drive (SSD) or a combination of the above memories, and provides instructions and data for the processor 21.

In short, the embodiment of the present disclosure provides the terminal. The terminal includes the processor, the memory storing instructions executable by the processor, the communication interface, and the bus for connecting the processor, the memory and the communication interface, wherein when executed by the processor, the instructions cause the processor to implement the above one or more methods.

The embodiments of the present disclosure provide a sharing method, a terminal and a storage medium. The method acquires the first transmission parameter and the number of first channels supported by one network mode; calculates and obtains the first storage parameter corresponding to the one network mode according to the number of the first channels, the first transmission parameter and a preset calculation model; determines the first storage area satisfying the first storage parameter, and allocates the storage space for the first channels according to the first storage area. That is, the embodiments of the present disclosure provide a sharing apparatus, a terminal and a storage medium, which are able to determine a storage area and a storage space magnitude of one storage area shared by all channels in one network mode according to basic parameters corresponding to the network mode, and allocate a storage space for the channels in the network mode according to the storage area, so that all channels in the network mode share one storage space, thereby greatly reducing the number of the storage spaces, solving the problem of a large number of address buses accessed by the storage space, and effectively reducing the waste of storage space resources.

Additionally, various functional modules in this embodiment may be integrated into one processing unit, or each unit may be separately and physically present, or two or more units may be integrated into one unit. The integrated unit may be implemented by hardware or a software functional module.

The integrated unit of the present disclosure may be stored in a computer-readable storage medium. If implemented in the form of a software functional module and sold or used as an independent product. Based on this understanding, the solution provided by the embodiment substantially, or the part contributing to the existing art, or all or part of the technical solution may be embodied in the form of a software product. The computer software product is stored in a storage medium and includes several instructions for enabling a computer device (which may be a personal computer, a server or a network device) or a processor to execute all or part of the steps in the method provided by the embodiment. The foregoing storage medium may be a U disk, a mobile hard disk, a read only memory (ROM), a random access memory (RAM), a magnetic disk, an optical disk or another medium that can store program codes.

An embodiment of the present disclosure provides a computer-readable storage medium, which stores programs and is applied to a terminal, where when executed by a processor, the programs cause the processor to implement the methods in embodiments one to five.

Specifically, program instructions corresponding to the sharing method may be stored in a storage medium such as an optical disk, a hard disk or a USB flash disk. When the program instructions, in the storage medium, corresponding to the video processing method are read or executed by an electronic device, including: acquiring the first transmission parameter and the number of first channels supported by one network mode; calculating and obtains the first storage parameter corresponding to the one network mode according to the number of the first channels, the first transmission parameter and a preset calculation model; determining the first storage area satisfying the first storage parameter, and allocating the storage space for the first channels according to the first storage area.

It should be understood by those skilled in the art that the embodiments of the present disclosure may be provided as methods, systems, or computer program products. Therefore, the present disclosure may adopt a form of a hardware embodiment, a software embodiment, or a combination of hardware and software embodiments. In addition, the present disclosure may adopt a form of a computer program product implemented on one or more computer-usable storage media (including, but not limited to, a disk memory, an optical memory, and the like) which include computer-usable program codes.

The present disclosure is described with reference to implementation flowcharts and/or block diagrams of methods, devices (systems) and computer program products according to the embodiments of the present disclosure. It should be understood that computer program instructions may implement each flow and/or block in the implementation flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing apparatus to produce a machine so that instructions executed by a computer or a processor of another programmable data processing apparatus produce a means for implementing the functions specified in one or more flows in the implementation flowcharts and/or one or more blocks in the block diagrams.

These computer program instructions may also be stored in a computer-readable memory which may direct the computer or another programmable data processing device to operate in a particular manner so that the instructions stored in the computer-readable memory produce a manufactured product including an instructing means. The instructing means implements the functions specified in one or more flows in the implementation flowcharts and/or one or more blocks in the block diagrams.

These computer program instructions can also be loaded onto the computer or other programmable data processing equipment so that a series of operation steps are performed on the computer or other programmable equipment to produce processing implemented by the computer. Therefore, instructions executed on the computer or other programmable equipment provide steps for implementing the functions specified in one or more flows in the implementation flowcharts and/or one or more blocks in the block diagrams.

The above is only the preferred embodiments of the present disclosure, and is not intended to limit the scope of the present disclosure. Modifications made in accordance with the principles of the present disclosure should be understood as falling within the scope of protection of the present disclosure.

What is claimed is:

1. A sharing method, comprising:
acquiring a first transmission parameter and a number of first channels supported by one network mode; and
calculating and obtaining a first storage parameter corresponding to the one network mode according to the number of first channels, the first transmission parameter and a preset calculation model;
determining a first storage area satisfying the first storage parameter, and allocating a storage space for the first channels according to the first storage area;
wherein before determining the first storage area satisfying the first storage parameter, the method further comprises:
determining a channel space threshold corresponding to the first channels according to the number of first channels and a preset space threshold corresponding to the one network mode; and
performing a channel configuration on the first channels according to the number of first channels and the channel space threshold;
wherein determining the channel space threshold corresponding to the first channels according to the number of first channels and the preset space threshold corresponding to the one network mode comprises:
in response to determining that the number of first channels is 1, determining the preset space threshold as the channel space threshold; and
in response to determining that the number of first channels is not 1, acquiring a backup space threshold corresponding to the first channels, and determining the channel space threshold according to the preset space threshold and the backup space threshold.

2. The method of claim 1, wherein after performing the channel configuration on the first channels according to the number of first channels and the channel space threshold and before allocating the storage space for the first channels according to the first storage area, the method further comprises:
detecting a number of configured channels in the one network mode, and a channel parameter corresponding to the configured channels; and
in response to determining that the number of configured channels equals to the number of first channels and the channel parameter equals to the channel space threshold, determining that the channel configuration of the first channels in the one network mode is completed.

3. The method of claim 1, wherein after calculating and obtaining the first storage parameter corresponding to the one network mode according to the number of first channels, the first transmission parameter and the preset calculation model, the method further comprises:
acquiring at least two first storage parameters corresponding to at least two network modes, wherein each of the at least two network modes corresponds to one first storage parameter; and
determining a maximum first storage parameter of the at least two first storage parameters as a second storage parameter.

4. The method of claim 3, wherein after determining the maximum first storage parameter of the at least two first storage parameters as the second storage parameter, the method further comprises:
replacing the first storage parameter with the second storage parameter, determining a second storage area satisfying the second storage parameter, and allocating a storage space for first channels supported by any one of the at least two network modes according to the second storage area.

5. A sharing apparatus, comprising:
a processor; and
a memory for storing instructions executable by the processor;
wherein the processor is configured to:
acquire a first transmission parameter and a number of first channels supported by one network mode;
calculate and obtain the first storage parameter corresponding to the one network mode according to the number of first channels, the first transmission parameter and a preset calculation model;

determine a first storage area satisfying the first storage parameter; and allocate a storage space for the first channels according to the first storage area;

wherein the processor is further configured to, before determining the first storage area satisfying the first storage parameter, determine a channel space threshold corresponding to the first channels according to the number of first channels and a preset space threshold corresponding to the one network mode; and perform a channel configuration on the first channels according to the number of first channels and the channel space threshold;

wherein the processor is further configured to, in response to determining that the number of first channels is 1, determine the preset space threshold as the channel space threshold; and in response to determining that the number of first channels is not 1, acquire a backup space threshold corresponding to the first channels, and determine the channel space threshold according to the preset space threshold and the backup space threshold.

6. The apparatus of claim 5, the processor is further configured to:

after performing the channel configuration on the first channels according to the number of first channels and the channel space threshold and before allocating the storage space for the first channels according to the first storage area, detect a number of configured channels in the one network mode, and a channel parameter corresponding to the configured channels; and in response to determining that the number of configured channels equals to the number of first channels and the channel parameter equals to the channel space threshold, determine that the channel configuration of the first channels in the one network mode is completed.

7. The apparatus of claim 5, wherein the processor is further configured to:

after calculating and obtaining the first storage parameter corresponding to the one network mode according to the number of first channels, the first transmission parameter and the preset calculation model, acquire at least two first storage parameters corresponding to at least two network modes, wherein each of the at least two network modes corresponds to one first storage parameter; and determine a maximum first storage parameter of the at least two first storage parameters as a second storage parameter.

8. The apparatus of claim 7, wherein the processor is further configured to:

after determining the maximum first storage parameter of the at least two first storage parameters as the second storage parameter, replace the first storage parameter with the second storage parameter, and determine a second storage area satisfying the second storage parameter; and allocate a storage space for first channels supported by any one of the at least two network modes according to the second storage area.

9. A sharing method, comprising:

acquiring a transmission parameter and a network mode supported by a terminal;

allocating a shared storage space equal to a maximum storage capacity required in the network mode according to the transmission parameter; and performing a configuration on the allocated shared storage space according to a transmission parameter of a network mode currently used by the terminal;

wherein allocating the shared storage space equal to the maximum storage capacity required in the network mode according to the transmission parameter comprises:

determining a storage parameter of the currently used network mode according to the transmission parameter, wherein the storage parameter comprises: at least one of a depth or a width of an application storage space required by the currently used network mode;

according to the storage parameter, selecting at least part of the storage space from the shared storage space and configuring the at least part of the storage space to be the application storage space of the network mode.

10. The sharing method of claim 9, wherein the transmission parameter comprises at least one of: a data transmission length or a data transmission width; and wherein performing the configuration on the allocated storage space according to the transmission parameter of the network mode currently used by the terminal comprises:

determining a depth of the application storage space according to the data transmission length and the data transmission width;

determining a width of the application storage space according to the data transmission width; and based on the depth and the width, selecting at least part of storage space from the shared storage space and configuring the at least part of storage space to be the application storage space.

11. The method of claim 9, wherein the method further comprises:

according to a number of channels required by the currently used network mode, allocating the application storage space as a sub-storage space equal to the number of channels.

12. The method of claim 9, wherein allocating the shared storage space equal to the maximum storage capacity required in the network mode according to the transmission parameter comprises: allocating the shared storage space equal to the maximum storage capacity required in the network mode according to the transmission parameter and a channel gap, wherein the channel gap is a capacity gap of storage spaces between channels in response to determining that the network mode needs a plurality of channels;

performing the configuration on the allocated shared storage space according to the transmission parameter and a number of channels corresponding to the network mode currently used by the terminal comprises: according to the transmission parameter and the channel gap, selecting at least part of storage space from the shared storage space and configuring the at least part of storage space to be the application storage space of the currently used network mode; and configuring channels equal to the number of required channels in the application storage space according to the channel gap, wherein a storage gap between different channels is not less than the channel gap.

13. A non-transitory computer-readable storage medium, which stores programs and is applied to a terminal, wherein when the programs are executed by a processor, the programs cause the processor to implement the method of claim 1.

14. A terminal, comprising a processor, a memory storing instructions executable by the processor, a communication interface, and a bus for connecting the processor, the memory and the communication interface, wherein when executed by the processor, the instructions cause the processor to implement the method of claim 9.

\* \* \* \* \*